US011218802B1

(12) United States Patent
Kandadai et al.

(10) Patent No.: US 11,218,802 B1
(45) Date of Patent: Jan. 4, 2022

(54) BEAMFORMER ROTATION

(71) Applicant: Amazon Technologies, Inc., Seattle, WA (US)

(72) Inventors: Srivatsan Kandadai, San Jose, CA (US); Amit Singh Chhetri, Sunnyvale, CA (US); Trausti Thor Kristjansson, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/141,012

(22) Filed: Sep. 25, 2018

(51) Int. Cl.
*H04R 3/00* (2006.01)
*G06F 3/16* (2006.01)
*G10L 25/60* (2013.01)
*G10L 25/84* (2013.01)
*H04R 1/40* (2006.01)

(52) U.S. Cl.
CPC ............. *H04R 3/005* (2013.01); *G06F 3/167* (2013.01); *G10L 25/60* (2013.01); *G10L 25/84* (2013.01); *H04R 1/406* (2013.01)

(58) Field of Classification Search
CPC ... H04R 1/24; H04R 1/26; H04R 1/32; H04R 1/46; H04R 1/326; H04R 1/406; H04R 3/005; H04R 2430/23; G10K 11/34; G06F 3/167; G10L 25/60; G10L 25/78; G10L 25/84
USPC .... 381/91, 92, 122, 110; 367/137, 138, 198; 704/214, 270.1, 272, 275
See application file for complete search history.

(56) References Cited

U.S. PATENT DOCUMENTS

| | | | | |
|---|---|---|---|---|
| 5,345,538 A * | 9/1994 | Narayannan | ............ | G10L 15/26 704/270 |
| 9,432,769 B1 * | 8/2016 | Sundaram | .............. | H04R 3/005 |
| 9,640,179 B1 * | 5/2017 | Hart | ........................ | G10L 15/20 |
| 9,837,099 B1 * | 12/2017 | Sundaram | .............. | H04R 3/005 |
| 9,973,848 B2 * | 5/2018 | Chhetri | ................... | H04R 3/005 |
| 10,147,439 B1 * | 12/2018 | Kristjansson | ......... | G10L 21/034 |
| 10,244,313 B1 * | 3/2019 | O'Neill | .................. | H04R 1/406 |
| 2010/0161255 A1 * | 6/2010 | Mian | .................... | G01N 29/041 702/56 |
| 2011/0125504 A1 * | 5/2011 | Ko | ........................ | B25J 13/003 704/275 |
| 2011/0301950 A1 * | 12/2011 | Ouchi | ..................... | G10L 15/28 704/231 |
| 2013/0148814 A1 * | 6/2013 | Karthik | .................. | H04R 3/005 381/56 |
| 2014/0270248 A1 * | 9/2014 | Ivanov | .................. | H04R 3/005 381/92 |
| 2015/0208156 A1 * | 7/2015 | Virolainen | .............. | H04S 7/303 381/92 |
| 2017/0245053 A1 * | 8/2017 | Virolainen | ............... | H04S 7/40 |

(Continued)

*Primary Examiner* — Xu Mei
(74) *Attorney, Agent, or Firm* — Pierce Atwood LLP

(57) ABSTRACT

A mobile device capable of capturing voice commands includes a beamformer for determining audio data corresponding to one or more directions and a beam selector for selecting in which direction a source of target audio lies. The device determines, based on data from one or more sensors, an angle through which the device has rotated. Based on the angle and one or more rotation-compensation functions, the device interpolates audio data corresponding to the one or more directions to compensate for the rotation such that the direction corresponding to the source of target audio remains selected.

20 Claims, 14 Drawing Sheets

(56) References Cited

U.S. PATENT DOCUMENTS

2018/0174584 A1* 6/2018 Chih .................. F16M 11/2014
2019/0208318 A1* 7/2019 Chowdhary .............. B81B 7/00

* cited by examiner

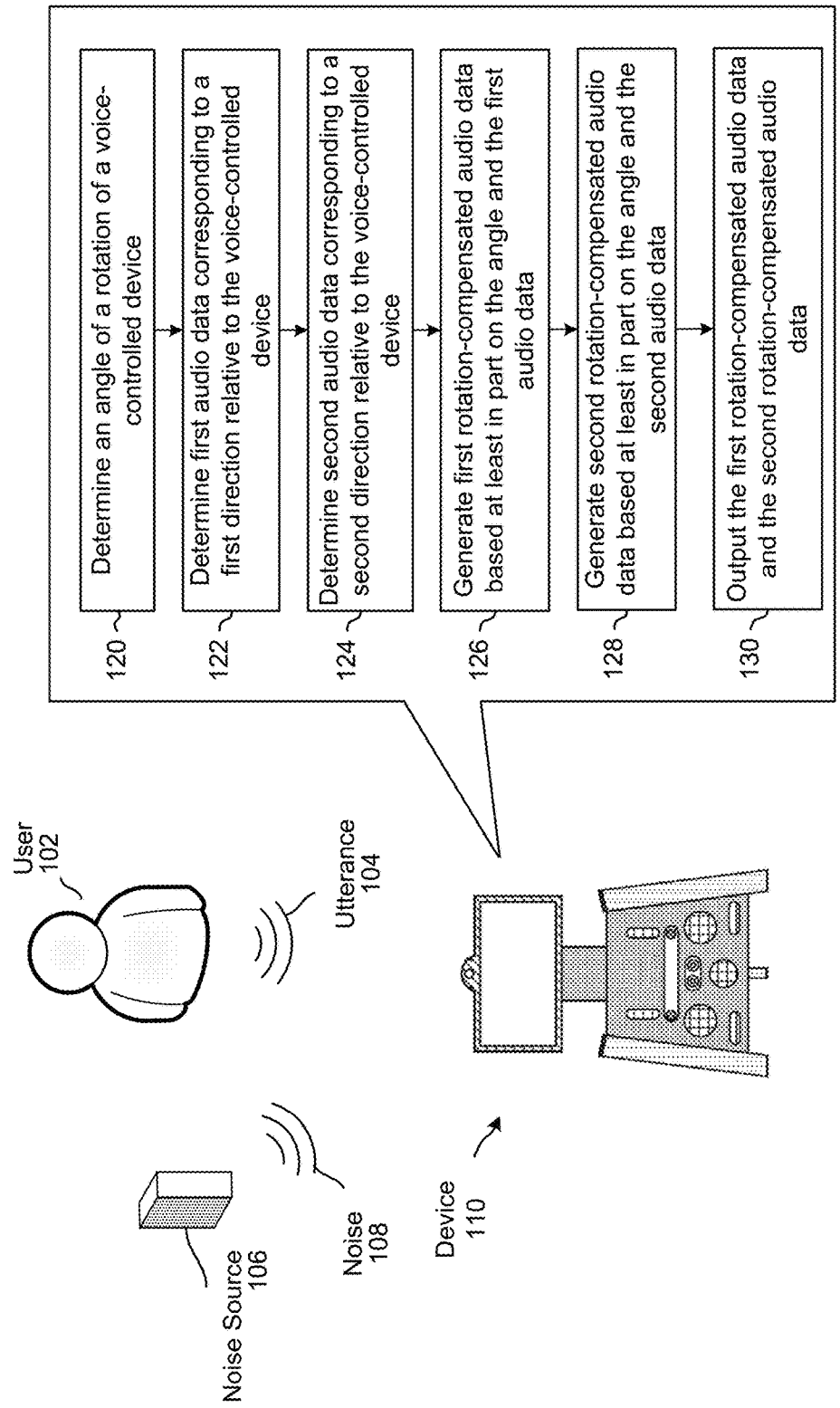

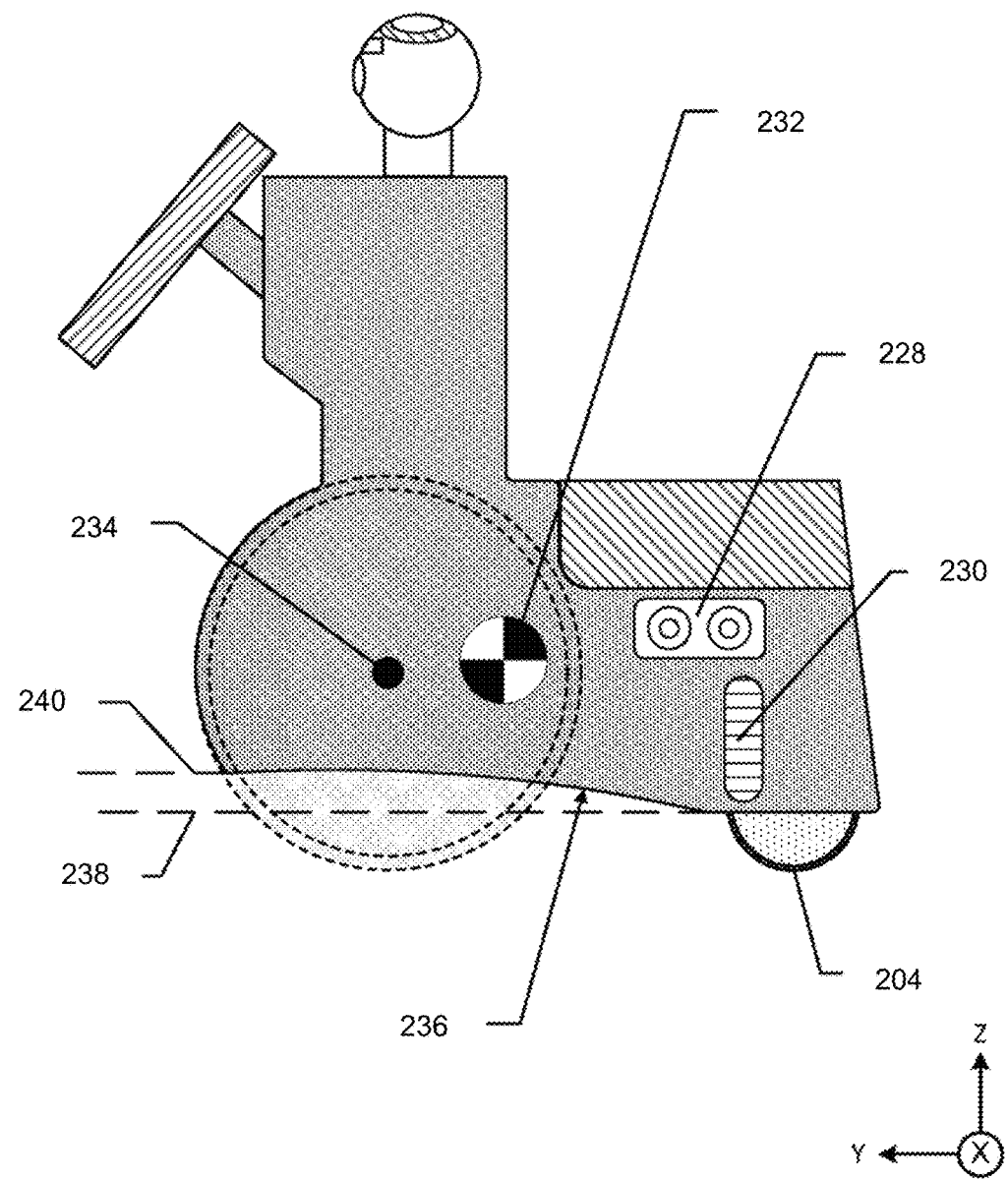

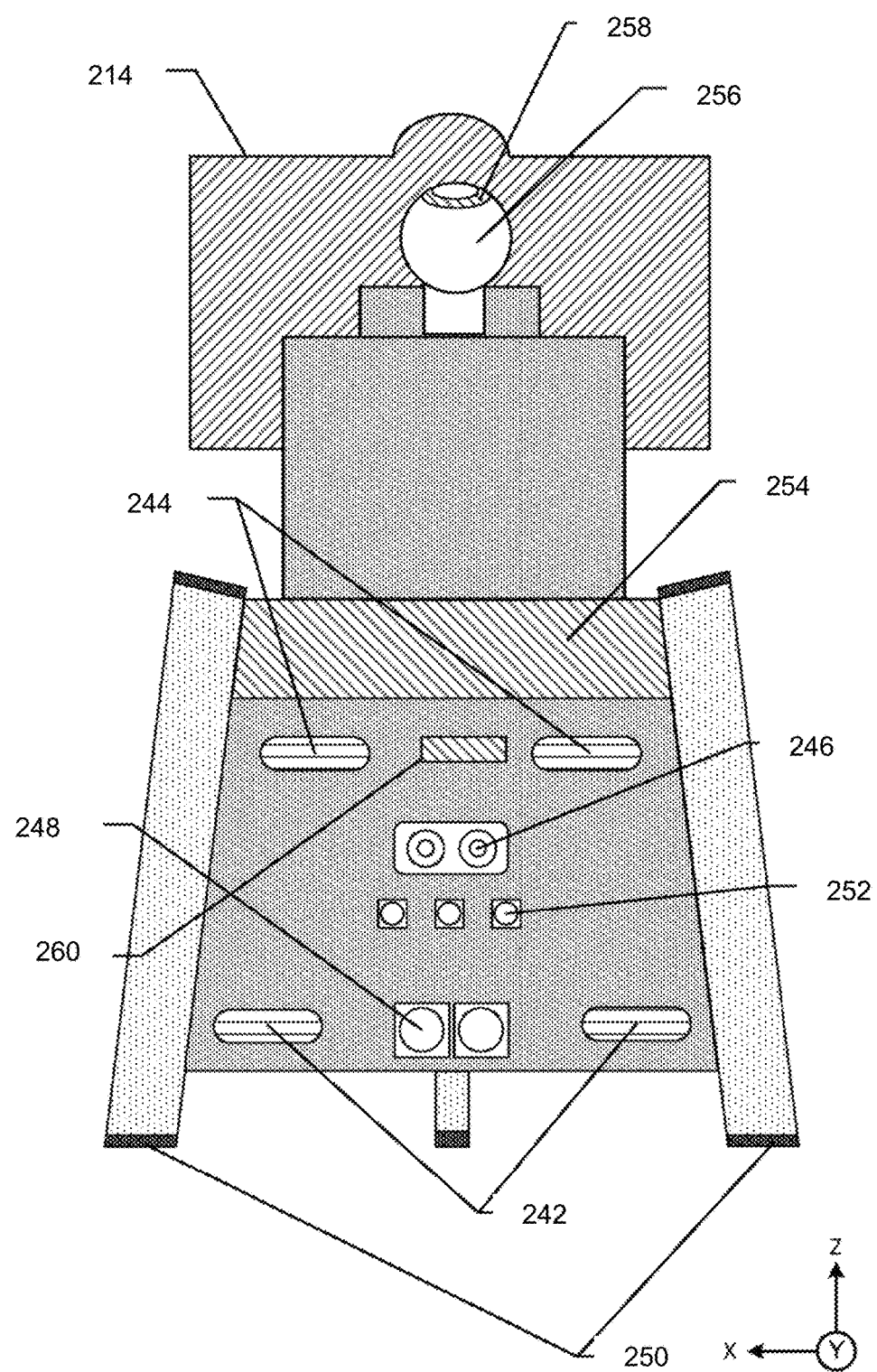

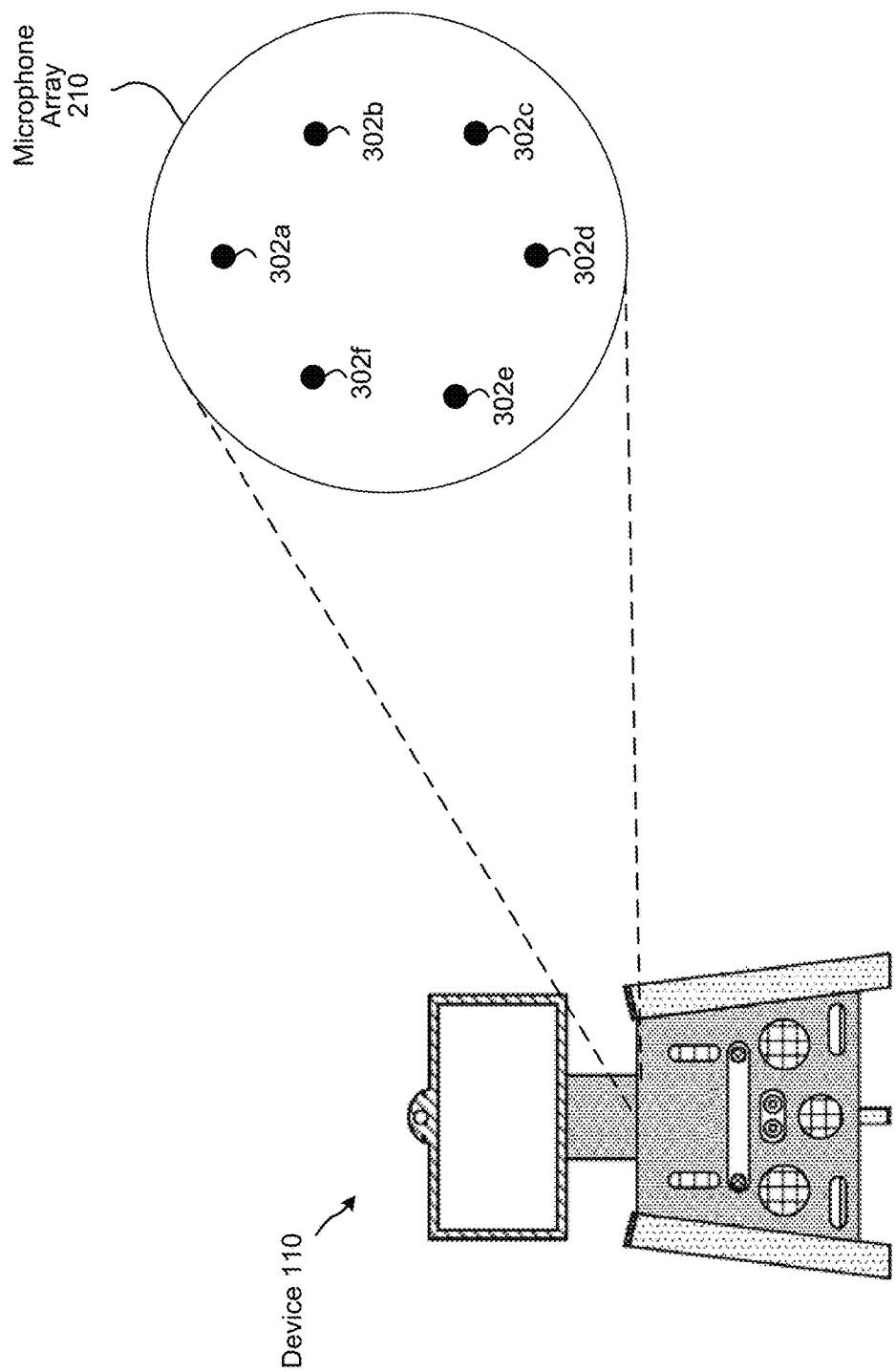

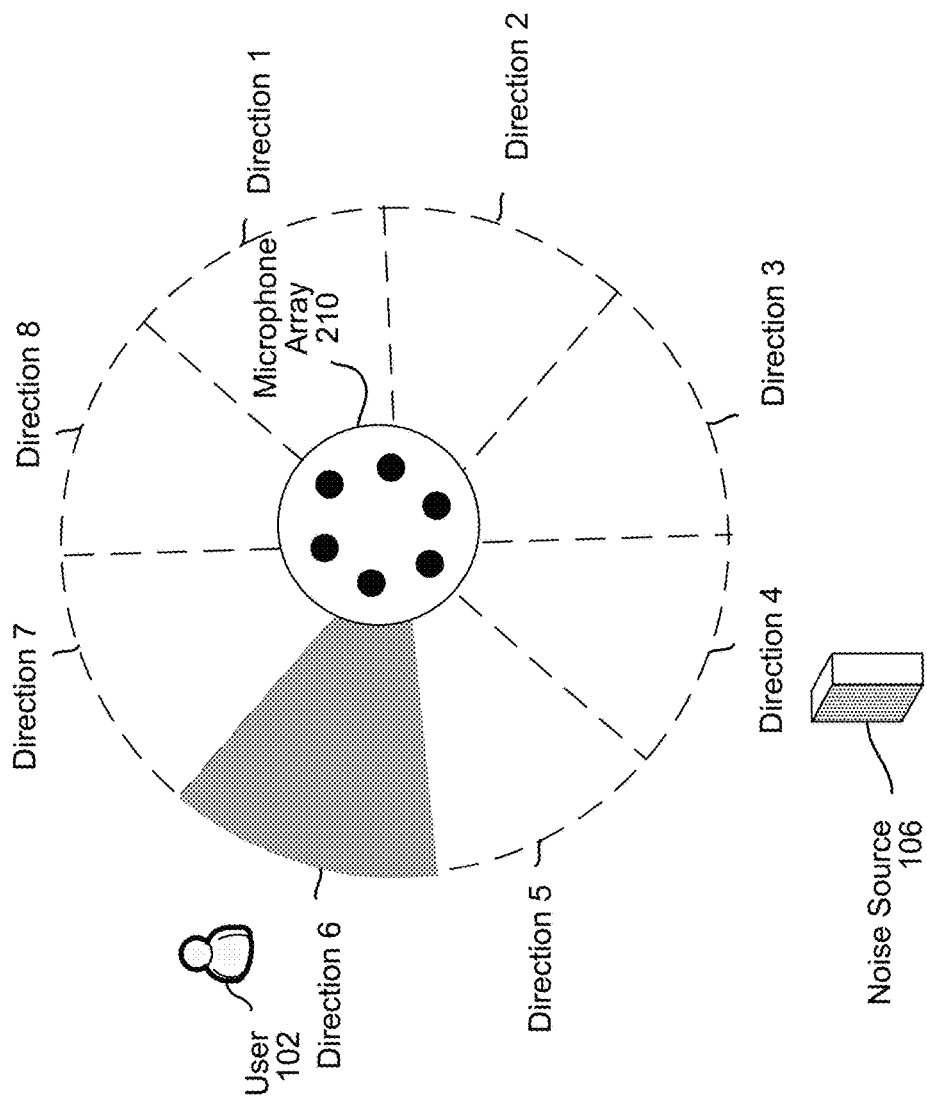

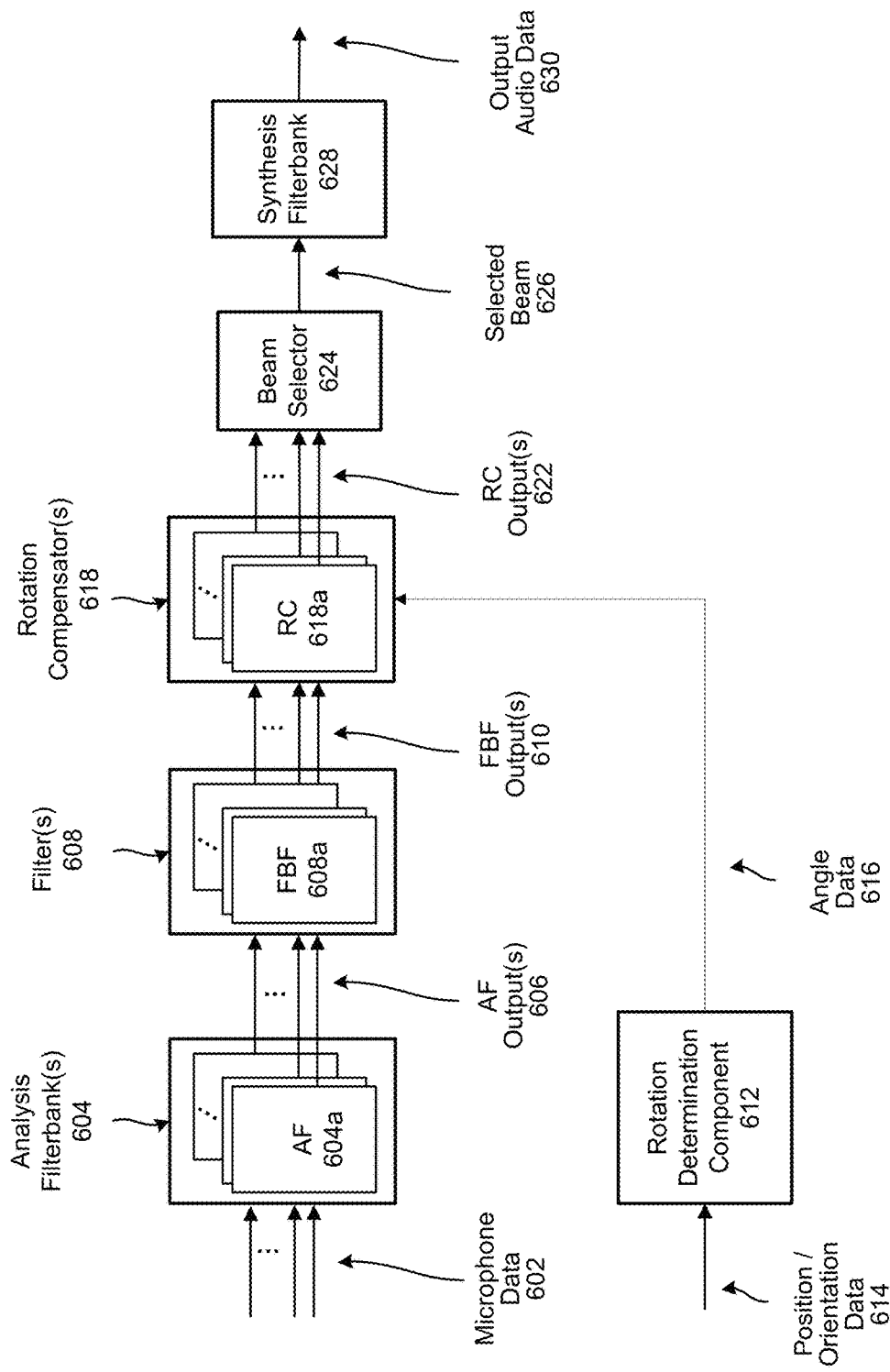

BEAMFORMER ROTATION

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIG. 1 illustrates a system and method for rotating beams of a voice-controlled device capable of autonomous motion in response to sensed rotation according to embodiments of the present disclosure.

FIGS. 2A, 2B, and 2C illustrate views of a voice-controlled device capable of autonomous motion according to embodiments of the present disclosure.

FIG. 3 illustrates a microphone array according to embodiments of the present disclosure.

FIGS. 5C and 5D illustrate rotation of a voice-controlled device according to embodiments of the present disclosure.

FIG. 6 illustrates a system for rotating beams in accordance with a sensed rotation according to embodiments of the present disclosure.

DETAILED DESCRIPTION

Figure 2A:
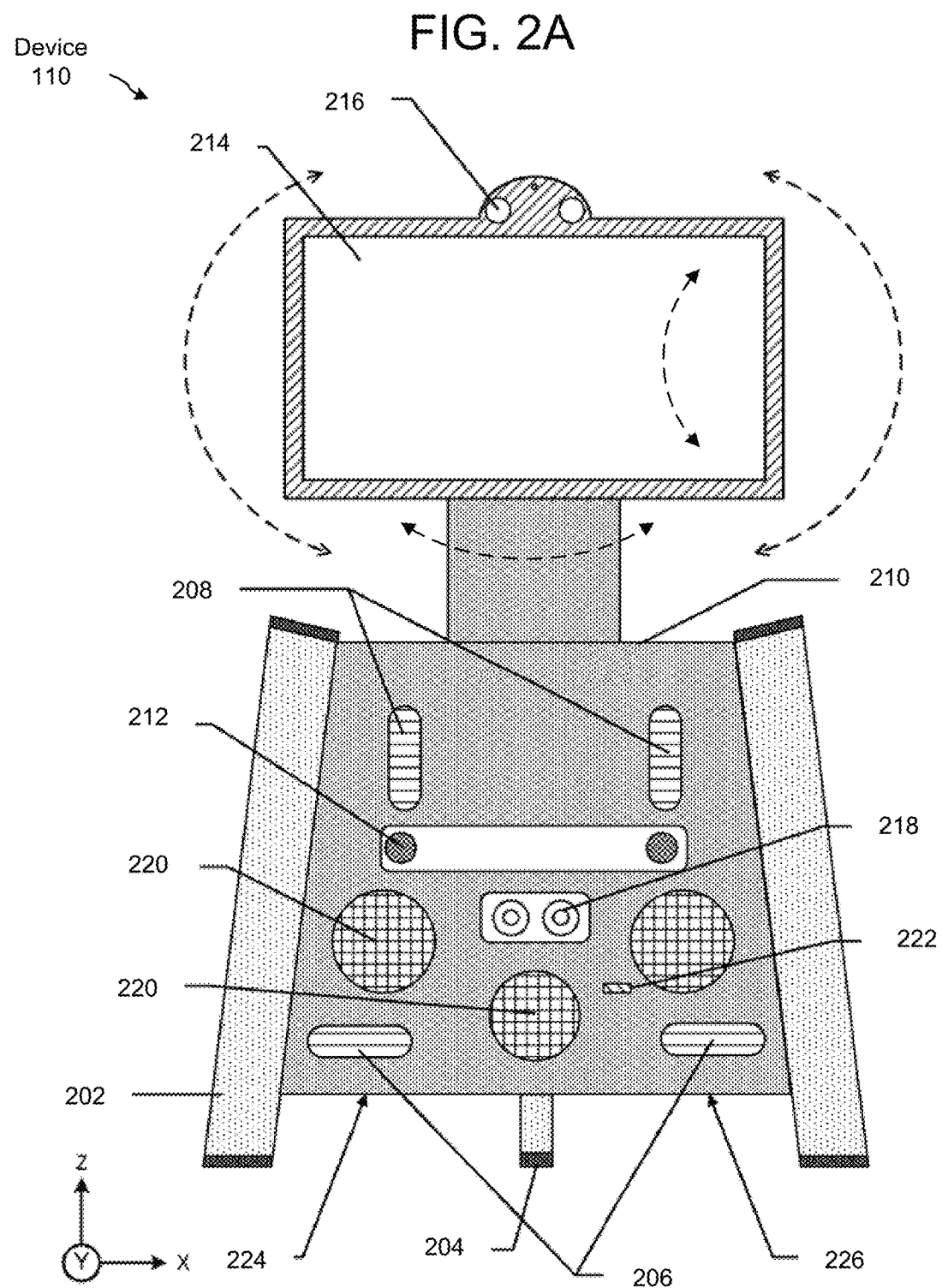

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

In audio systems, beamforming refers to techniques that are used to isolate audio from one or more particular directions. Beamforming may be particularly useful when filtering out noise from non-desired directions. Beamforming may be used for various tasks, including isolating voice commands to be executed by a speech-processing system.

Certain devices capable of capturing speech for speech processing may operate using a microphone array comprising multiple microphones, where beamforming techniques may be used to isolate desired audio including speech. Beamforming systems isolate audio from a particular direction in a multi-directional audio capture system. One technique for beamforming involves boosting audio received from a desired direction while dampening audio received from a non-desired direction.

In one example of a beamformer system, a fixed beamformer unit employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer unit may thus instead or in addition include an adaptive beamformer unit/noise canceller that may adaptively cancel noise from different directions depending on audio conditions.

Typically, beamforming is done by determining filter coefficient values (e.g., Finite Impulse Response (FIR) filter coefficient values) for each beam direction (e.g., look direction, direction of interest, etc.) based on a position of physical microphones in the microphone array 214. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

FIG. 1 illustrates a system that includes a voice-controlled device 110, which is described in greater detail below. In various embodiments, the voice-controlled device 110 is capable of autonomous movement/motion using one or motors powering one or more wheels, treads, robotic limbs, or similar actuators. The device 110 may, for example, follow a user 102 around a room to thereby allow the user 102 easier access to features of the device 110. The device 110 may further include one or more display screens for displaying information to a user 102 and/or receiving touch input from a user. The device 110 may further include a microphone array including one or more microphones and one or more loudspeakers; the microphone array and loudspeakers may be used to receive audio data, such as an utterance 104, from the user 104; the utterance may be, for example, a command or request. The device 110 may be used to output audio to the user 102, such as audio related to a command or audio related to a request. A nearby noise source 106 may output noise audio 108.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The voice-controlled device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user 102. In other embodiments, the device 110 may be a smart speaker, smart phone, or other such device. The disclosure is not, however, limited to only these devices or components, and the voice-controlled device 110 may include additional components without departing from the disclosure.

In various embodiments, with reference to FIG. 1, the device 110 determines (120) an angle of rotation of the device 110. The device 110 determines (122) first audio data corresponding to a first direction relative to the voice-controlled device and determines (124) second audio data corresponding to a second direction relative to the voice-controlled device. The device generates (126) first rotation-compensated audio data based at least in part on the angle and the first audio data and generates (128) second rotation-compensated audio data based at least in part on the angle and the second audio data. The device 110 then outputs (130) the first rotation-compensated audio data and the second rotation-compensated audio data (for, e.g., later automatic speech recognition (ASR), natural-language understanding (NLU), or other speech processing). The speech processing may be wholly or partially performed by the device 110 or by a remote device.

FIG. 2A illustrates a front view of the voice-controlled device 110 according to various embodiments of the present disclosure. The device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

One or more cameras 212 may be mounted to the front of the device 110; two cameras 212 may be used to provide for stereo vision. The distance between two cameras 212 may be, for example, 5-15 centimeters (cm); in some embodiments, the distance is 10 cm. In some embodiments, the cameras 212 may exhibit a relatively wide horizontal field-of-view (HFOV). For example, the HFOV may be between 90° and 110°. A relatively wide FOV may provide for easier detection of moving objects, such as users or pets, which may be in the path of the device 110. Also, the relatively wide FOV may provide for the device 110 to more easily detect objects when rotating or turning.

Cameras 212 used for navigation may be of different resolution from, or sensitive to different wavelengths than, other cameras 212 used for other purposes, such as video communication. For example, navigation cameras 212 may be sensitive to infrared light allowing the device 110 to operate in darkness or semi-darkness, while a camera 216 mounted above a display 214 may be sensitive to visible light and may be used to generate images suitable for viewing by a person. A navigation camera 212 may have a resolution of at least 300 kilopixels each, while the camera 216 mounted above the display 214 may have a resolution of at least 10 megapixels. In other implementations, navigation may utilize a single camera 212.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another.

An ultrasonic sensor 218 may be mounted on the front of the device 110 and may be used to provide sensor data that is indicative of objects in front of the device 110.

One or more speakers 220 may be mounted on the device 110, and the speakers 220 may have different audio properties. For example, low-range, mid-range, and/or high-range speakers 220 may be mounted on the front of the device 110. The speakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical motion sensors (FOMS) 224, 226 may be disposed on the underside of the device 110. The FOMS 224, 226 may provide indication indicative of motion of the device 110 relative to the floor or other surface underneath the device 110. In some embodiments, the FOMS 224, 226 comprise a light source, such as light-emitting diode (LED) and/or an array of photodiodes. In some implementations, the FOMS 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the FOMS 224, 226 may provide other information, such as data indicative of a pattern present on the floor, composition of the floor, color of the floor, and so forth. For example, the FOMS 224, 226 may utilize an optoelectronic sensor that may detect different colors or shades of gray, and this data may be used to generate floor characterization data.

FIG. 2B illustrates a side view of the voice-controlled device 110 according to various embodiments of the present disclosure. In this side view, the left side of the device 110 is illustrated. An ultrasonic sensor 228 and an optical sensor 230 may be disposed on either side of the device 110.

The disposition of components of the device 110 may be arranged such that a center of gravity (COG) 232 is located between a wheel axle 234 of the front wheels 202 and the caster 204. Such placement of the COG 232 may result in improved stability of the device 110 and may also facilitate lifting by a carrying handle 128.

In this illustration, the caster 110 is shown in a trailing configuration, in which the caster 110 is located behind or aft of the wheel axle 234 and the center of gravity 232. In another implementation (not shown) the caster 110 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the voice-controlled device 110 according to various embodiments of the present disclosure. In this view, as with the front view, a first pair of optical sensors 242 are located along the lower edge of the rear of the robot 100, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258.

FIG. 3 illustrates further details of the microphone array 210. In some embodiments, the microphone array 210 includes six microphones 302*a*, 302*b*, 302*c*, 302*d*, 302*e*, and 302*f* arranged in a rectangular grid. The present disclosure is not, however limited to any particular number or arrangement of microphones.

The microphone array 210 may include a number of different individual microphones. The individual microphones may capture sound and pass the resulting audio signal created by the sound to a downstream component, as discussed below. Each individual piece of audio data captured by a microphone may be in the time domain. To isolate audio from a particular direction, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

FIGS. 4 and 5A-5D illustrate various aspects of beamforming using the device 110 and the microphone array 210. As discussed above, the device 110 may perform beamforming (e.g., perform a beamforming operation to generate beamformed audio data corresponding to different directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficient values associated with specific directions. For example, the device 110 may perform a first directional calculation by applying first filter coefficient values to the input audio signals to generate the first beamformed audio data and may perform a second directional calculation by applying second filter coefficient values to the input audio signals to generate the second beamformed audio data.

The filter coefficient values used to perform the beamforming operation may be calculated offline (e.g., preconfigured ahead of time) and stored in the device 110. For example, the device 110 may store filter coefficient values associated with hundreds of different directional calculations (e.g., hundreds of specific directions) and may select the desired filter coefficient values for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficient values) being referred to as a "first beam" corresponding to the first direction, the second directional calculation (e.g., second filter coefficient values) being referred to as a "second beam" corresponding to the second direction, and so on. Thus, the device 110 stores hundreds of "beams" (e.g., directional calculations and associated filter coefficient values) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficient values used to generate the first beam.

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal quality values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

In some examples, some or all of the above steps may be performed in the time domain. For example, the device 110 may apply filter coefficient values g(t) in the time domain to the input audio data to generate the beamforming data and may perform acoustic echo cancellation in the time domain.

The present disclosure is not, however limited thereto. Instead or in addition, the device 110 may receive first input audio data in the time domain and may perform a transform, such as a Fast Fourier Transform (FFT), on the first input audio data to generate second input audio data in the frequency domain. The device 110 may then apply filter coefficient values g(ω) in the frequency domain to the second input audio data to generate the LCB audio data and may perform acoustic echo cancellation in the frequency domain to generate first modified input audio data. The device 110 may perform an inverse transform, such as an Inverse Fast Fourier Transform (IFFT), on the first modified input audio data to generate second modified input audio data in the time domain. Thus, the device 110 performs beamforming and/or acoustic echo cancellation in the time domain and/or the frequency domain without departing from the disclosure. Additionally or alternatively, the device 110 may perform acoustic echo cancellation in a subband domain without departing from the disclosure. For example, the device 110 may separate different frequency ranges (e.g., subbands) and may perform acoustic echo cancellation differently for each frequency range without departing from the disclosure.

The device 110 may beamform the input audio data into a plurality of beams (e.g., perform a beamforming operation to generate one or more items of processed audio data corresponding to one or more directions). As used herein, the term beam may refer to particular audio data corresponding to the modified input audio data that was captured by the microphone array, where the particular audio data of a beam corresponds to a particular direction. Thus, each beam may include audio data corresponding to a particular direction relative to the device 110. A beamforming unit or component of the device 110 (such as an adaptive beamformer) may divide the modified input audio data into different beams of audio data, each corresponding to a direction.

In various embodiments, beamforming is performed using a minimum-variance distortionless-response (MVDR) beamformer. A MVDR beamformer may apply filter coefficients, or "weights" w to the frequency-domain signal in accordance with the following equation:

$$w = \frac{Q^{-1}d}{d^H Q^{-1}d} \tag{1}$$

In Equation (1), Q is the covariance matrix and may correspond to the cross-power spectral density (CPSD) of a noise field surrounding the device 110, and d is a steering vector that corresponds to a transfer function between the device 110 and a target source of sound located at a distance (e.g., two meters) from the device 110. The covariance matrix may define the spatial relationships between the microphones; this covariance matrix may include a number of covariance values corresponding to each pair of microphones. The covariance matrix is a matrix whose covariance value in the i, j position represents the covariance between the $i^{th}$ and $j^{th}$ elements of the microphone arrays. If the greater values of one variable mainly vary with the greater values of the other variable, and the same holds for the lesser values, (i.e., the variables tend to show similar behavior), the covariance is positive. In the opposite case, when the greater values of one variable mainly vary to the lesser values of the other, (i.e., the variables tend to show opposite behavior), the covariance is negative. In some embodiments, the covariance matrix is a spatial covariance matrix (SCM).

For example, a covariance value corresponding to the second row and third column of the matrix corresponds to the relationship between second and third microphones. In various embodiments, the values of the diagonal of the covariance matrix differ for the first and second microphone arrays; the covariance values of the diagonal corresponding to the first microphone may, for example, be greater than the covariance values of the diagonal corresponding to the second microphone. When input audio is processed with the covariance matrix, an utterance from an azimuth direction and/or elevation is more clearly distinguished and better able to be processed with, for example, ASR or speech-to-text processing.

In various embodiments, a different covariance matrix is determined for each of multiple frequency sub-bands. For example, a first covariance matrix is determined for frequencies between 20 Hz and 5 kHz; a second covariance matrix is determined for frequencies between 5 kHz and 10 kHz; a third covariance matrix is determined for frequencies between 10 kHz and 15 kHz; and a fourth covariance matrix is determined for frequencies between 15 kHz and 20 kHz. Any number of covariance matrices for any number or breakdown of frequency sub-bands is, however, within the scope of the present disclosure.

Various machine learning techniques may be used to create the weight values of the covariance matrix. For example, a model may be trained to determine the weight values. Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. In particular, CRFs are a type of discriminative undirected probabilistic graphical models and may predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves may be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

Figure 4:
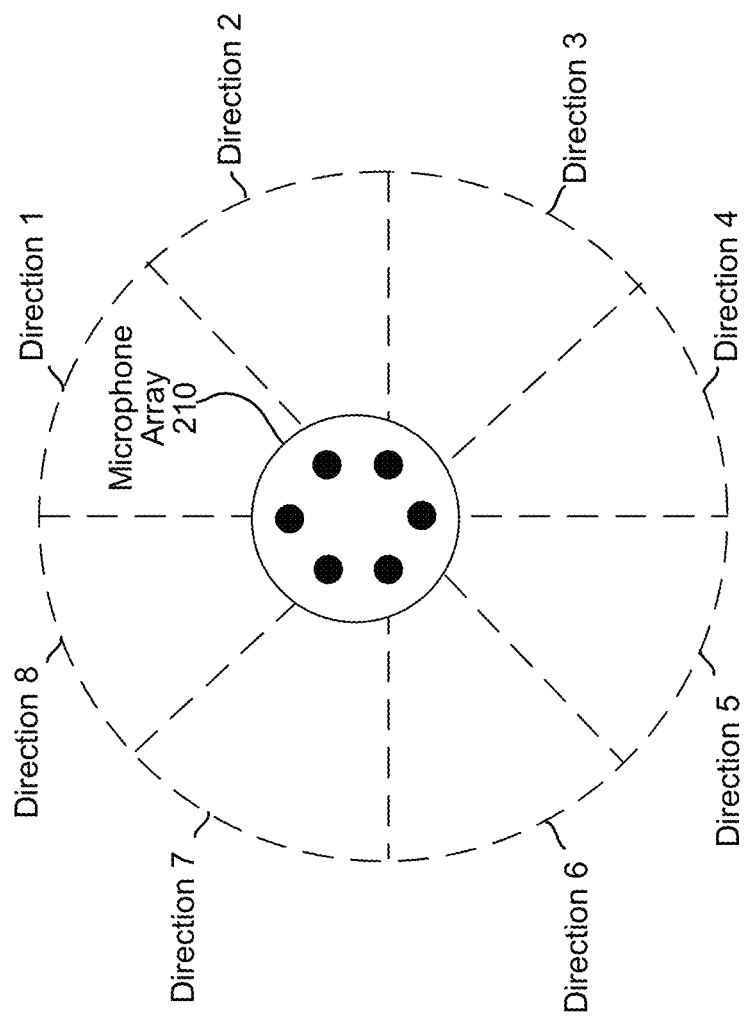
FIG. 4 illustrates associating directions with microphones of a microphone array according to embodiments of the present disclosure.

Using such direction isolation techniques, the device 110 may isolate directionality of audio sources. As shown in FIG. 4, a number of different directions 1-8 may be isolate. Each direction may be associated with a particular microphone of the microphone array 210, where the azimuth angles for the plane of the microphone array may be divided into bins (e.g., 0-45 degrees, 46-90 degrees, and so forth) where each bin direction is associated with a microphone in the microphone array. For example, direction 1 may be associated with microphone 302a, direction 2 may be associated with microphone 302b, and so on. Alternatively, particular directions and/or beams may not necessarily be associated with a specific microphone. Thus, the present disclosure is not limited to any particular number of microphones or directions, and the number of microphones and directions may differ.

To isolate audio from a particular direction the device 110 may apply a variety of audio filters to the output of the microphones 302a-f where certain audio is boosted while other audio is dampened, to thereby create isolated audio corresponding to a particular direction 1-8, which may be referred to as a beam. While the number of beams may correspond to the number of microphones, this need not be the case. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit and/or a fixed beamformer (FBF) unit processing pipeline for each beam.

The device 110 may use various techniques to determine the beam corresponding to the look direction. If audio is detected first by a particular microphone the device 110 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

Figure 5A:
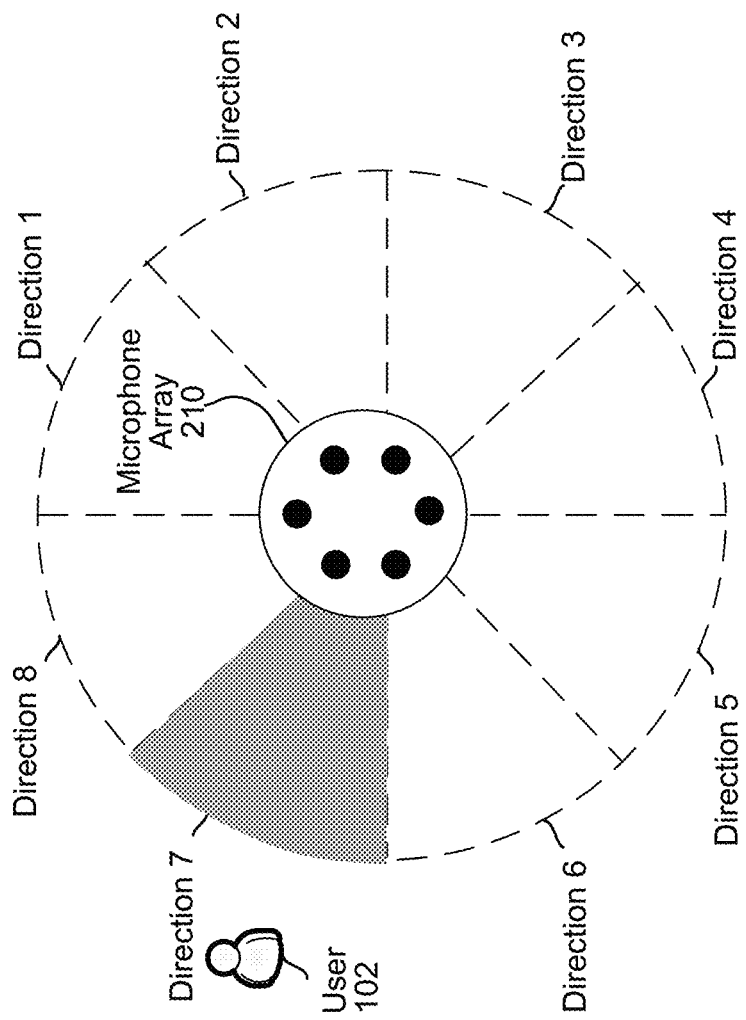
FIGS. 5A and 5B illustrate isolating audio from a direction to focus on a desired audio source according to embodiments of the present disclosure.

For example, the device may determine that the user is located in a location in direction 7. Using a fixed beamformer unit or other such component, the device may isolate audio coming from direction 7 using techniques known to the art and/or explained herein. Thus, as shown in FIG. 5A, the device 110 may boost audio coming from direction 7, thus increasing the amplitude of audio data corresponding to speech from user 102 relative to other audio captured from other directions. In this manner, noise from diffuse sources that is coming from all the other directions will be dampened relative to the desired audio (e.g., speech from user 102) coming from direction 7.

Figure 5B:
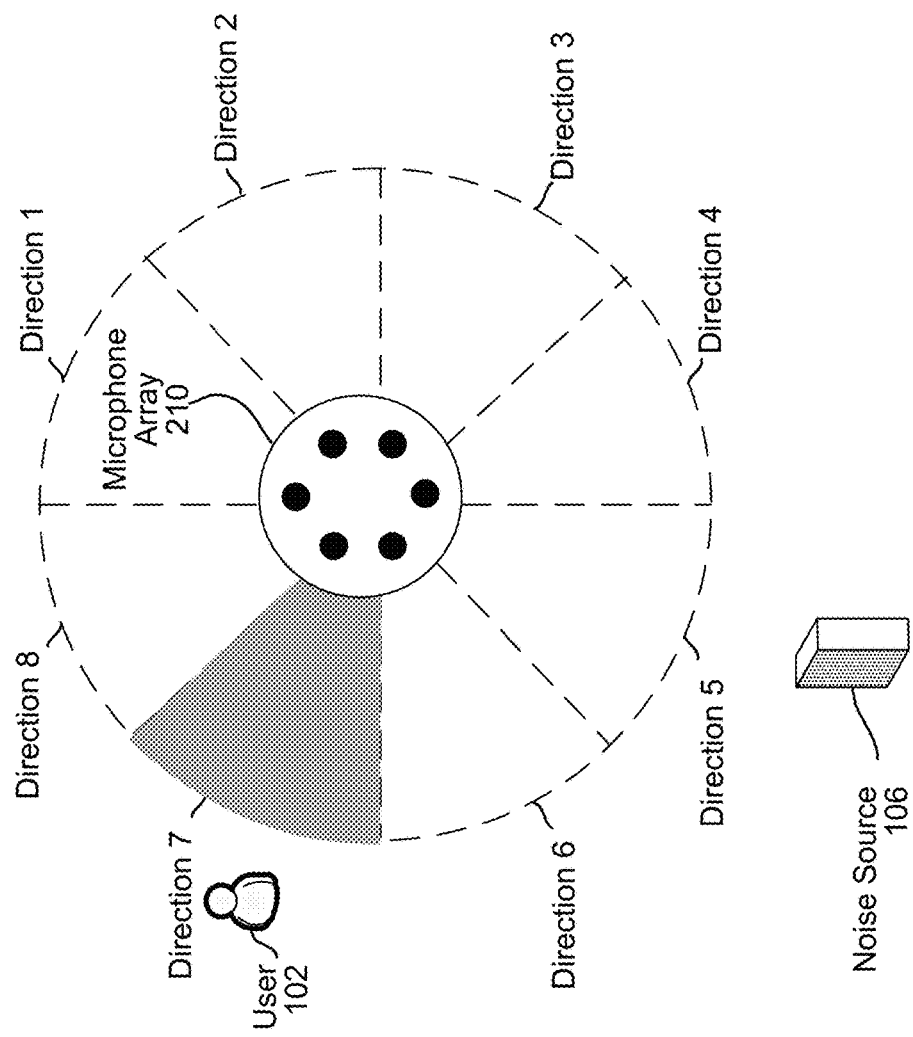
Figure 5C:
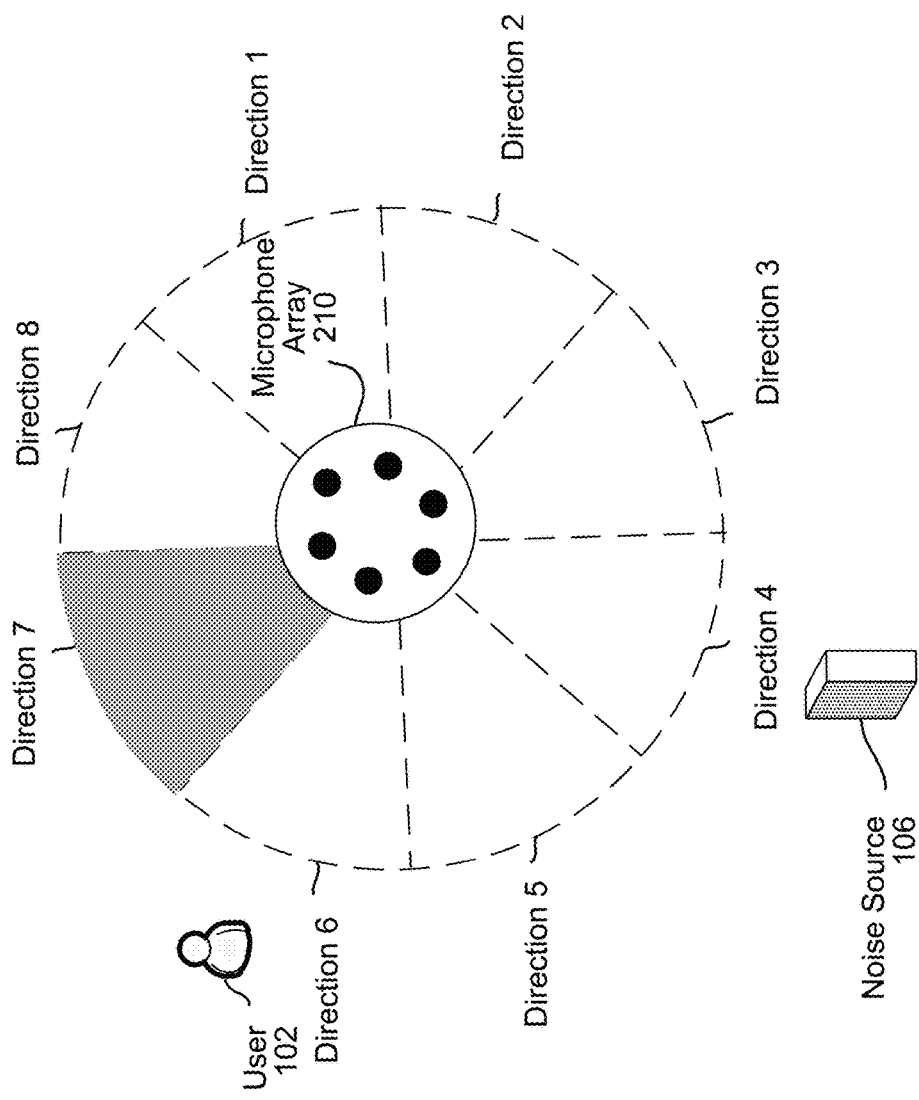

In various embodiments, with reference to FIG. 5B, the device 110 may be disposed proximate the user 102 in a direction 7 and a noise source 106 (or other source of audio) in another direction 5. In order to reduce noise originating from the noise source 106, as explained herein, the device 110 may determine that sound output by the user 102 is below a volume threshold and then determine that the noise source 106 is disposed at direction 5 using the beamforming techniques described herein. FIG. 5C illustrates the effects of rotation of the device 110: after a rotation, the user 102 is disposed in direction 6, while the noise source is disposed in direction 4. In FIG. 5D, the device 110 rotates its target beam to direction 6 to account for the rotation in accordance with the present disclosure. Although illustrated as rotation in one plane, rotation may also occur in multiple planes and the device 110 may also change its distance to the user 102. The teachings herein apply for many different rotation/movement examples or configurations.

FIG. 6 illustrates a system for beamforming that includes rotating beams in response to a detected rotation according to embodiments of the present disclosure. In various embodiments, the microphone array 210 creates audio data 602 corresponding to input audio, such as an utterance by the user 102. The audio data 600 may be received by an analysis filterbank 604, which may include one or more analysis filterbank (AF) components 604a, 604b, etc. The analysis filterbank 604 may convert the time-domain audio data 602 into frequency-domain audio data 604 using, for example, a Fourier transform (such as a Fast Fourier Transform (FFT)). Each AF component 604 may convert a different frequency range or "bin" corresponding to the time-domain audio data 602. In some embodiments, 128 AF components 604 create 128 different frequency bins for the AF output 606.

The AF output data 606 is received by a filter 608 having one or more filter units 608a, 608b, etc. In some embodiments, the filter 608 is a fixed beamformer (FBF) and the filter units 608a, 608b, etc. are fixed beamforming units. The filter 608 may isolate audio from a desired direction by boosting audio received from the desired direction while dampening audio received from a non-desired direction. For example, each of the filter units 608 may include a filter-and-sum structure to boost an audio signal that originates from the desired direction (e.g., look-direction) while largely attenuating audio signals that originate from other directions.

The number of filter units included in the filter 608 may correspond to a desired number of beams. For example, to generate twelve beams, the device 110 may include twelve separate filter units, with each filter unit processing the microphone outputs AF output data 606 to generate an individual beam (e.g., directional output, directional audio signal, beamformed audio data, or the like) corresponding to a particular direction. The filter 608 may generate fixed beamformer outputs 610, whose number corresponds to the desired number of beams.

Each particular FBF unit may be tuned with filter coefficient values to boost audio from one of the particular beams. For example, filter unit 608a may be tuned to boost audio from beam 1, filter unit 608b may be tuned to boost audio from beam 2, and so forth. The filtered audio signals will then be summed together to create the output audio signal. Thus, the FBF unit may phase-align microphone audio data toward a given direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficient values may be represented as $H_{BF,m}(r)$, where r=0, R, where R denotes the number of beamformer filter coefficient values in the subband domain. Thus, the output Y of the filter and sum unit may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n - r) \quad (2)$$

The number of microphone outputs 602 and the number of fixed beamformer outputs 610 may not be the same. The number of audio channels included in the microphone outputs 602 and/or the number of beams are typically factors of two (e.g., 2, 4, 6, 8, 12, etc.), although the disclosure is not limited thereto. For example, the microphone array 210 may include eight microphones whereas the device 110 may generate twelve beams. Additionally or alternatively, the number of audio channels included in the microphone outputs 602 and the number of beams may be the same without departing from the disclosure.

A rotation determination component 612 may determine a rotation and/or change in rotation of the device 110 based on received position/orientation data 614, which may be generated by one or more of the sensors described above. For example, the rotation determination component 612 may receive data from the accelerometer and gyroscope and, based on the data, determine angle data 616 corresponding to an amount of a change in an angle rotation of the device 110. The rotation determination component 612 may, for example, determine that a certain change in data from the gyroscope corresponds to a certain angle of rotation based on a predetermined relationship between the gyroscope data and the rotation. In various embodiments, the position/orientation data 614 changes to include new position/orientation information approximately 20 times per second, and the rotation determination component 612 determines new corresponding angle data 616 approximately 20 times per second.

A rotation compensation component 618 receives the FBF output 620 and angle data 616 and based thereon, as explained in greater detail below, applies one or more rotation-compensation functions to the FBF output 620 to create one or more rotation compensation (RC) outputs 622. The RC outputs 622 represent an interpolation between two or more beams represented in the FBF output 620 to thereby rotate a beam corresponding to a source of target audio. In various embodiments, the rotation compensation component 618 updates the RC output data 622 every 50 milliseconds in accordance with the angle data 616 changing approximately 20 times per second. In other embodiments, however, the rotation compensation component 618 updates the RC output data 622 every 10-20 milliseconds.

A beam selector 624 receives the RC outputs 622 and, in accordance with the various techniques described herein, such as selecting a loudest beam, selects data corresponding to a selected beam 626. The beam selector 624 may select one or more of the beams as output beams. For example, the beam selector 624 may determine one or more signal quality values (e.g., loudness, SNR, power value, signal-to-noise plus interference ratio (SINR), and/or other signal quality metrics known to one of skill in the art) associated with each of the fixed beamformer outputs 620 and may select the fixed beamformer output 620 having the highest signal quality metric as the output beam(s). In various embodiments, the beam selector 624 is capable of selecting a new beam every 100-200 milliseconds; the rotation compensation component 618 is thus capable of responding to a rotation and rotating beams to target a source of audio faster than the beam selector 624.

A synthesis filterbank 628 may be used to convert the frequency-domain data back to time-domain output audio data 630 using, for example, an inverse Fourier transform (such as an Inverse Fast Fourier Transform (IFFT)).

Figure 7:
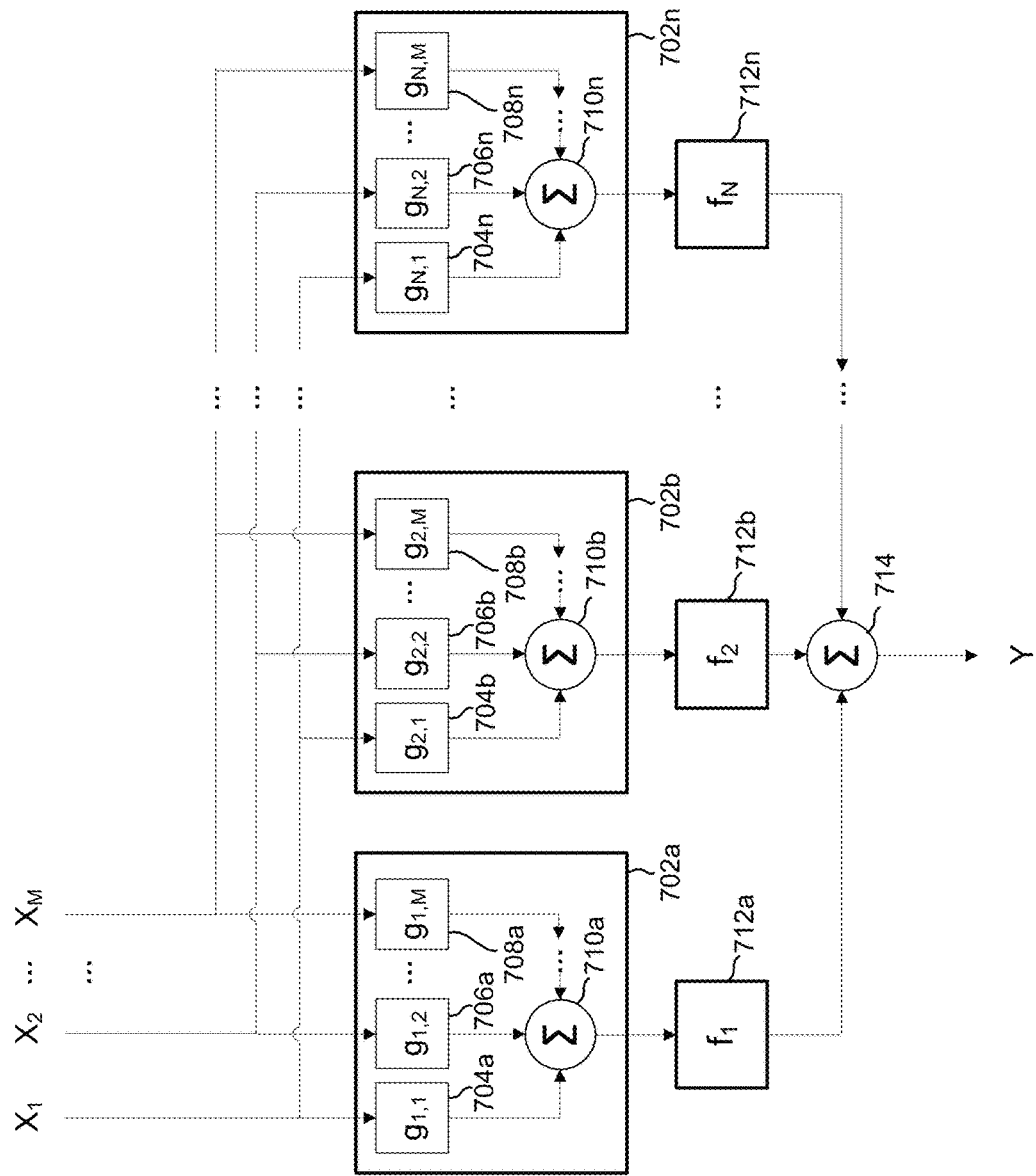
FIG. 7 illustrates a system for modifying data in accordance with rotation-compensation functions according to embodiments of the present disclosure.

FIG. 7 is a block diagram illustrating a system for rotating beams in accordance with embodiments of the present disclosure. The rotation compensator may be implemented using the rotation compensation component 618 described with reference to FIG. 6; in some embodiments, the beam rotation system is implemented partly in the filter 608 and in the rotation compensation component 618. The present disclosure is not, however, limited to any particular implementation.

In various embodiments, the system 700 receives a plurality of audio signals $X_1, X_2, \ldots X_M$ corresponding to a plurality of M microphones in the microphone array 210. The signals $X_0, X_1, \ldots X_M$ are processed using a corresponding plurality of N beamforming components 702a, 702b, ... 702n corresponding to N beams, in accordance with the systems and methods described above, to create audio data corresponding to various directions. For example, the first signal $X_1$ is processed using a first beamforming filter $g_{1,1}$ 704a of the first beamforming component 702a, a first beamforming filter $g_{2,1}$ 704b of the second beamforming component 702b, and a first beamforming filter $g_{N,1}$ 704n of the nth beamforming component 702n. The second signal $X_2$ is processed using a second beamforming filter $g_{1,2}$ 706a of the first beamforming component 702a, a second beamforming filter $g_{2,2}$ 706b of the second beamforming component 702b, and a second beamforming filter $g_{N,2}$ 706n of the nth beamforming component 702n. The mth signal $X_M$ is processed using an mth beamforming filter $g_{1,M}$ 708a of the first beamforming component 702a, an mth beamforming filter $g_{2,M}$ 708a of the second beamforming component 702b, and an mth beamforming filter $g_{N,M}$ 708n of the nth beamforming component 702n. The outputs of the M beamforming filters 704, 706, ... 708 of each beamforming component 702a may be combined (e.g., added) using one of M summation components 710a, 710b, ... 710n corresponding to each of the N beamforming components 702a, 702b, ... 702n, which may then output the combined result.

The N outputs of the N beamforming components 702a, 702b, ... 702n—i.e., audio data corresponding to N directions—are received by N rotation compensation filters 712a, 712b, 712n that each modify the N outputs of the N beamforming components 702a, 702b, ... 702n in accordance with N rotation-compensation functions $f_1, f_2, f_N$ to create rotation-compensated audio data. The rotation-compensated audio data output by the N rotation compensation filters 712a, 712b, ... 712n may then be combined using a summation component 714 to produce an output signal Y. The output signal Y may be represented by the below rotation-compensation function (3).

$$Y = g_1(\omega)f_1(\theta) + g_2(\omega)f_2(\theta) + \ldots + g_N(\omega)f_N(\theta) \quad (3)$$

In equation (3), θ represents the angle of rotation; ω represents the frequency of the input signals $X_0, X_1, \ldots X_M$; $f_1, f_2, f_N$ represent the N rotation-compensation functions; and $g_1, g_2, \ldots g_N$ represent the outputs of the N beamforming components 702. For example, the below function (4) represents the output of the first beamforming component 702a.

$$g_1 = g_{1,1}(\omega)X_1(\omega) + g_{1,2}(\omega)X_2(\omega) + \ldots + g_{1,M}(\omega)X_M(\omega) \quad (4)$$

The N rotation-compensation functions $f_1, f_2, \ldots f_N$ may be quantization functions, polynomial functions, truncated sync functions, Gaussian interpolation functions, complex kernel functions, or any other functions. In operation, the N rotation-compensation functions $f_1, f_2, f_N$ may interpolate two or more beams determined by the fixed beamformer 608 to create one or more new beams in accordance with a determined rotation. As described above, the rotation-compensation functions may be used to output the output signal Y by interpolating between the outputs of the beamforming components 702. In other embodiments, the rotation-compensation functions may be used to interpolate between filter coefficients associated with filters of the N beamforming components 702 to create rotation-compensated filter coefficients, which may be used to update the filters.

In some embodiments, the rotation compensator 700 is used to create data Y corresponding to a rotated beam. In other embodiments, the rotation-compensated audio data output by the N rotation-compensation functions $f_1, f_2, \ldots f_N$ are also or instead sent to the beam selector 624, which may select one of the outputs as the selected beam. Further, a number of different rotation compensators 700 may be used for each of a number of different frequency bins.

In some embodiments, the N rotation-compensation functions $f_1, f_2, \ldots f_N$ that output the rotation-compensated audio data are quantization functions that the rotation compensator 618 uses to select one of the beams 620 output by the filter 608 in response to the angle data 616. The rotation compensator 618 may determine that an angle $\theta_1$ corresponding to a rotation matches an angle $\theta_2$ associated with a separation between a first beam and a second beam. The beam selector 624 selects the first beam prior to the rotation, the rotation compensator 618 selects, based on the angle $\theta_1$, the second beam after the rotation. For example, with reference also to FIG. 5C, the beam selector 624 selects direction 7 prior to the rotation. Because, in this example, there are 8 beams of equal size, the angle $\theta_2$ associated with a separation between adjacent beams is 45°. If the rotation determination component 612 determines that the angle $\theta_1$ corresponding to the rotation is also 45° or approximately 45°, the rotation compensation component 618 selects the beam corresponding to direction 6. In this example, the rotation-compensation functions $f_1, f_2, f_3, f_4, f_5, f_6, f_7, f_8$ may be unitary functions and may be set to (0,0,0,0,0,0,1,0) before the rotation (e.g., selecting the $7^{th}$ beam) and to (0,0,0,0,0,1,0,0) after the rotation (e.g., selecting the $6^{th}$ beam).

In some embodiments, the N rotation-compensation functions $f_1, f_2, f_N$ are polynomial functions of the form of the below rotation-compensation function (5).

$$Y = g_1(\omega) + g_2(\omega)\theta + g_3(\omega)\theta^2 + \ldots + g_N(\omega)\theta^{N-1} \quad (5)$$

In equation (5), θ represents the angle of rotation; ω represents the frequency of the input signals $X_0, X_1, \ldots X_M$; and $g_1, g_2, \ldots g_N$ represent the outputs of the N beamforming components 702. As mentioned above, however, the present disclosure is not limited to only quantization or polynomial functions, and one of skill of the art will understand that the N rotation-compensation functions $f_1, f_2, \ldots f_N$ may be other types of functions, such as truncated sync functions, Gaussian sync functions, or complex kernel functions. The function type and coefficients related thereto may be determined based on the geometry of the microphone array 210, by simulation of the microphone array 210, and/or by training a model of the microphone array 210.

In some embodiments, the angle data 616 determined by the rotation determination component 612 contains an error; the angle of rotation θ determined by the rotation determination component 612 differs from an actual angle of rotation of the device 110. The beam selector 624 may detect this error by determining that a quality metric associated with a selected beam prior to rotation decreases after rotation. For example, the beam selector 624 may determine a signal-to-noise ratio (SNR) of a selected beam and determine that the SNR fell after the rotation compensator 618 rotated the beam. In these embodiments, the beam selector 624 may send data to the rotation compensator 618 indicative of the decreased metric. Upon receipt of this data, the rotation compensator 618 may attempt to fix the error by sweeping the rotated beam in one or both directions. For example, the rotation compensator 618 may shift the rotated beam by 1° increments in a clockwise direction and then in a counter-clockwise direction. The rotation compensator 618 may stop sweeping the beam when the beam selector 624 indicates that the quality metric has returned to or is near its previous level. The rotation compensator 618 may store a history of such errors and eventual solutions to the errors, if any—e.g., what type of motion led to the error and how far the selected beam needed to be rotated, and in which direction, to correct the errors. Once a threshold number of errors and solutions is reached, the rotation compensator 618 may update some or all of the equations and/or coefficients described above to reduce or eliminate future errors.

Other parts of the present disclosure are directed to rotation in a single plane, such as a horizontal or x,y plane (with reference to FIG. 2A); this rotation may be caused by the device 110 turning or spinning on its wheels 202 and may be referred to as a "pan." One of skill in the art will understand, however, that this rotation may be in a vertical or y,z plane; this rotation may be caused by the device 110 tilting the microphone array 210 up or down and may be referred to as a "tilt." The systems and methods discussed herein may be used to compensate for rotation—panning or tilting—in either the horizontal plane or vertical plane or in multiple planes/along multiple axes at once.

One of skill in the art will further understand that the present disclosure may be extended to address rotation in multiple planes (i.e., simultaneous horizontal and vertical rotation). Thus, if $\theta$ represents an amount of horizontal rotation ("panning") and $\varphi$ represents an amount of vertical rotation ("tilting"), the below rotation-compensation function (6) may be used to represent the output signal Y.

$$Y = g_1(\omega)l_1(\theta,\varphi) + g_2(\omega)l_2(\theta,\varphi) + \ldots + g_N(\omega)l_N(\theta,\varphi) \quad (6)$$

In equation (6) the functions 1 are vertical analogs of the functions f described above and may be determined similarly.

Similarly, the output signal Y may be determined by detecting an amount of horizontal and/or vertical movement—i.e., linear motion—of the device 110. For example, with reference to FIG. 5A, if the user 102 is in direction 7, but the device 110 moves in direction 8, the relative position of the user may move to direction 6. The device 110 may determine a distance from the device 110 to the user 102 in any of a number of ways, such as by analyzing images taken by one or more cameras 212. The device may thereafter determine an amount of movement, such as linear motion in the horizontal or x,y plane, based on data from one or more sensors, such as an accelerometer or positioning system. Based on the distance and the amount of movement, the device 110 may determine an amount to rotate the beams. The corresponding output signal Y may be thus represented by the below rotation-compensation function (7).

$$Y = g_1(\omega)i_1(x,y) + g_2(\omega)i_2(x,y) + \ldots + g_N(\omega)i_N(x,y) \quad (7)$$

One of skill in the art will understand that equation 7 may be modified to include terms from equation 3 or equation 6 to create an output signal Y that includes beam rotation compensation for movement and rotation in one or two dimensions.

In some embodiments, the systems and methods described herein may be used to increase a number of beams output by a fixed beamformer, such as the filter 608. For example, the filter 608 may output only eight beams, such as is depicted in FIG. 4, but operation of the device 110 may be improved by using a greater number of beams, such as sixteen beams. Changing the filter 608 to create the greater number of beams may be difficult or impossible, however, because its hardware or firmware cannot be changed, because an associated processor may not be fast enough to compute sixteen beams, or for any other reason. The rotation compensator 618 may thus be used to create additional beams by interpolating between existing beams. For example, the rotation compensator 618 may create a ninth beam corresponding to a ninth direction by interpolating between a first beam corresponding to direction one and a second beam corresponding to direction eight.

Figure 8:
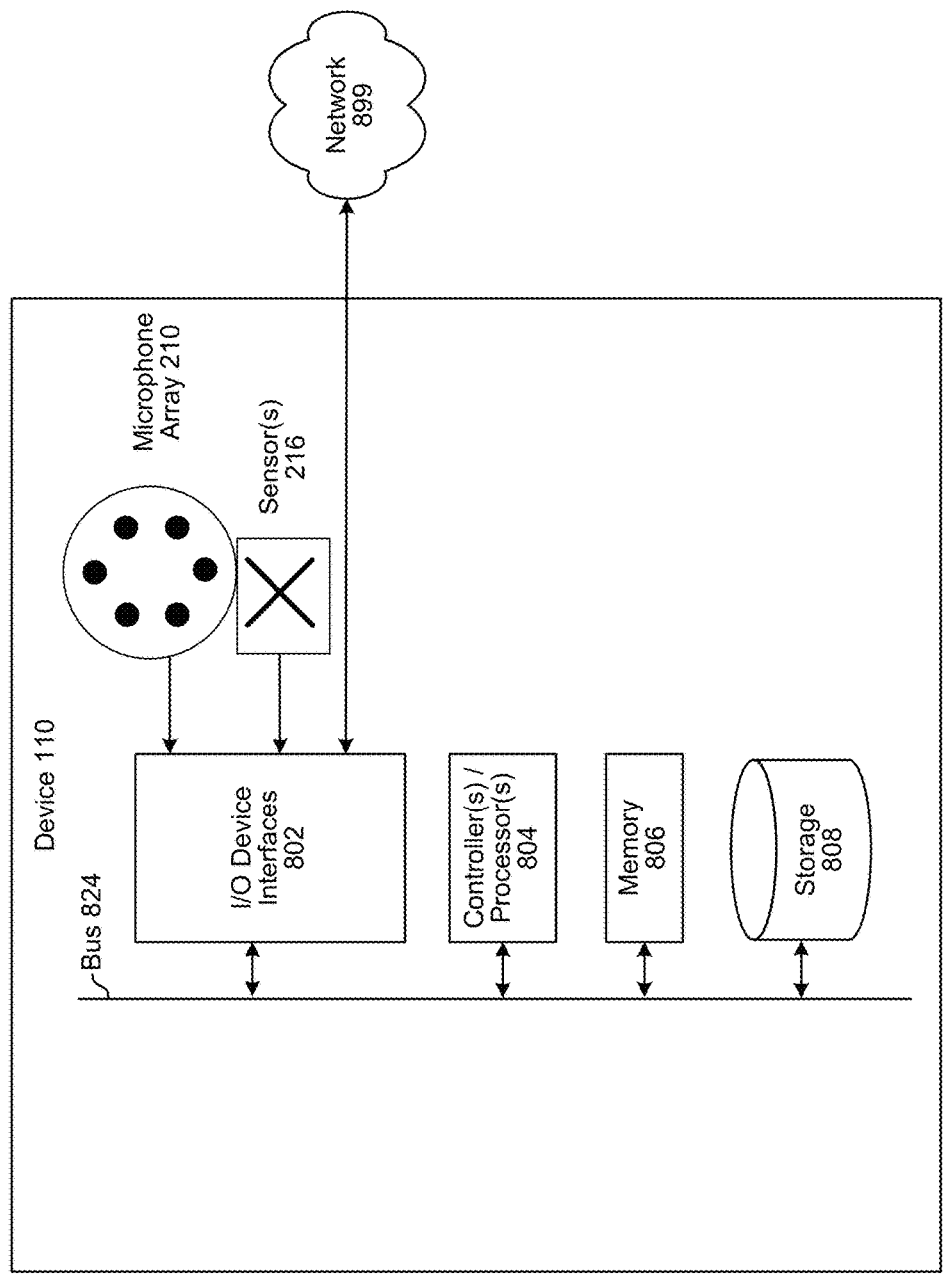
FIG. 8 illustrates a system for rotating beams in accordance with a sensed rotation according to embodiments of the present disclosure.

FIG. 8 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 214 which may include a plurality of microphones. The audio capture device(s) may be integrated into a single device or may be separate. The device 110 may also include a built-in audio output device for producing sound, such as built-in loudspeaker(s) 216. The audio output device may be integrated into a single device or may be separate. The device 110 may include an address/data bus 824 for conveying data among components of the device 110. Each component within the device may also be directly connected to other components in addition to (or instead of) being connected to other components across the bus 824.

The device 110 may include one or more controllers/processors 804, which may each include a central processing unit (CPU) for processing data and computer-readable instructions, and a memory 806 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform operations discussed herein). The data storage component 808 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

Computer instructions for operating the device 110 and its various components may be executed by the controller(s)/processor(s) 804, using the memory 806 as temporary "working" storage at runtime. The computer instructions may be stored in a non-transitory manner in non-volatile memory 806, storage 808, or an external device. Alternatively, some or all of the executable instructions may be embedded in hardware or firmware in addition to or instead of software.

The device 110 may include input/output device interfaces 802. A variety of components may be connected through the input/output device interfaces 802, such as the microphone array 214, the built-in loudspeaker(s) 216, and a media source such as a digital media player (not illustrated). The input/output interfaces 802 may include A/D converters (not illustrated) and/or D/A converters (not illustrated).

The input/output device interfaces 802 may also include an interface for an external peripheral device connection such as universal serial bus (USB), FireWire, Thunderbolt or other connection protocol. The input/output device interfaces 802 may also include a connection to one or more networks 899 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 899, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

Figure 9:
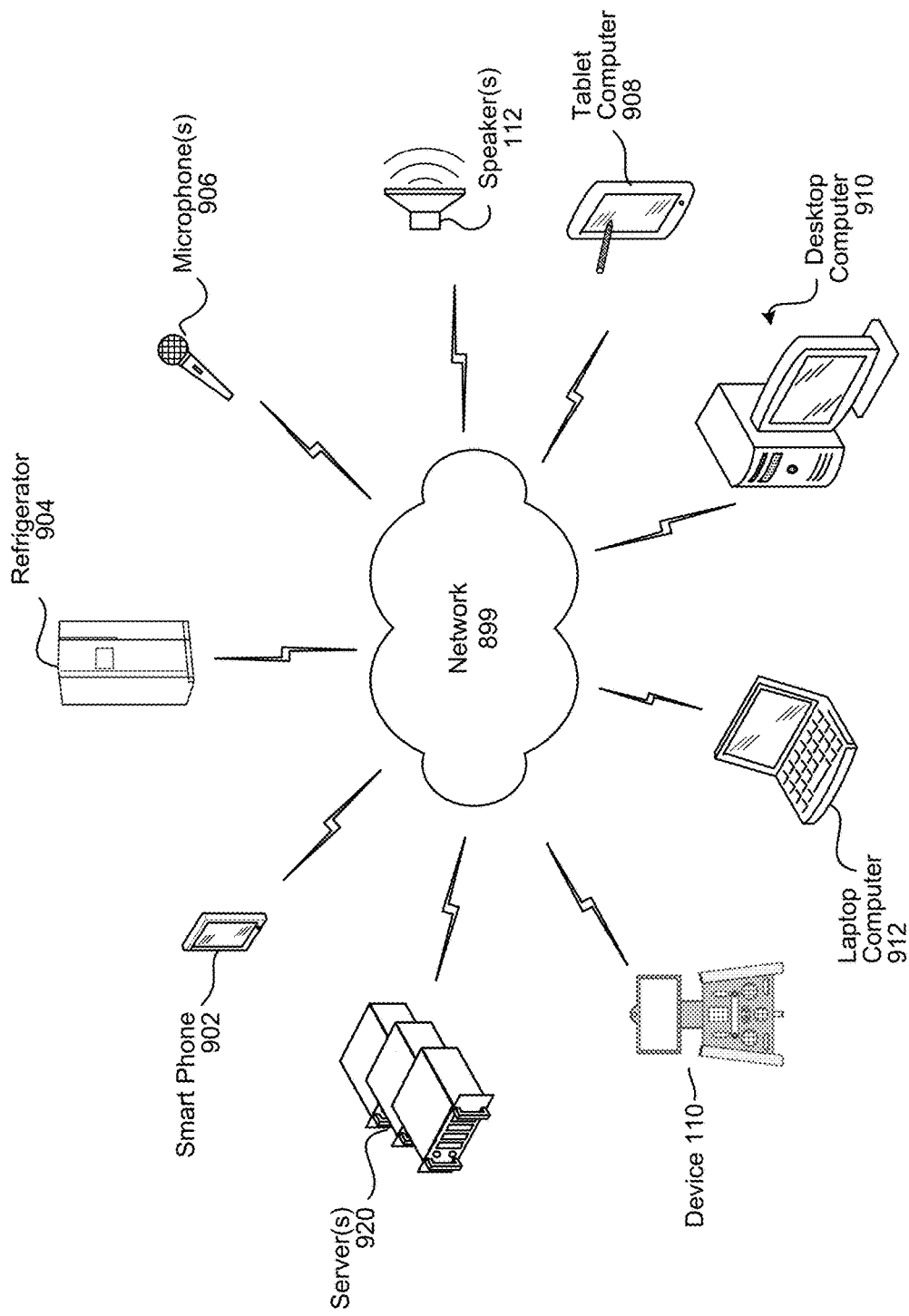
FIG. 9 illustrates a network including a system for rotating beams in accordance with a sensed rotation according to embodiments of the present disclosure.

As illustrated in FIG. 9, the device 110 may be connected over a network(s) 899. The network(s) 899 may include a local or private network or may include a wide network such as the Internet. Devices may be connected to the network(s) 899 through either wired or wireless connections. For example, the device 110a, a smart phone 902, a smart refrigerator 904, a wireless microphone 906, a tablet computer 908, a desktop computer 910, and/or a laptop computer 912 may be connected to the network(s) 899 through a wireless service provider, over a WiFi or cellular network connection, or the like. Other devices are included as network-connected support devices, such as a server 920. The support devices may connect to the network(s) 899 through a wired connection or wireless connection.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the device 110 may be implemented by a digital signal processor (DSP).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    determining first data representing movement of a device from a first location to a second location, wherein the device has a first orientation at the first location and a second orientation at the second location, the second orientation differing from the first orientation by a change in angle of rotation;
    performing beamforming, using at least one microphone array of the device, to generate first audio data corresponding to a first direction relative to the device;
    performing beamforming, using the at least one microphone array, to generate second audio data corresponding to a second direction relative to the device; and
    generating output data using the first data, the first audio data, and the second audio data.

2. The computer-implemented method of claim 1, further comprising:
    determining that the first direction corresponds to a source of audio;
    determining a first angle corresponding to the rotation;
    determining a second angle corresponding to a difference between the first direction and the second direction;
    determining the second angle is approximately equal to the first angle; and
    generating rotation-compensated audio data based at least in part on the second direction corresponding to the source of the audio,
    wherein generating the output data uses the rotation-compensated audio data.

3. The computer-implemented method of claim 1, further comprising:
    receiving, from a first microphone of the microphone array, first microphone data; and receiving, from a second microphone of the microphone array, second microphone data, wherein generating the first audio data comprises:
  generating first phase-shifted microphone data by shifting, by a first amount, a phase of the second microphone data, and
  generating the first audio data using the first microphone data and the first phase-shifted microphone data; and
wherein generating the second audio data comprises:
  generating second phase-shifted microphone data by shifting, by a second amount different from the first amount, a phase of the second microphone data, and
  generating the second audio data using the first microphone data and the second phase-shifted microphone data.

4. The computer-implemented method of claim 1, wherein:
  receiving third audio data corresponding to the first direction;
  receiving fourth audio data corresponding to the second direction; and
  generating, based on the third audio data and the fourth audio data, fifth audio data corresponding to a third direction between the first direction and the second direction.

5. The computer-implemented method of claim 1, further comprising:
  determining a first angle corresponding to the rotation;
  determining a second angle corresponding to a second rotation of the device, the second angle corresponding to a first dimension;
  determining a third angle corresponding to a third rotation of the device, the third angle corresponding to a second dimension;
  generating third audio data corresponding to the first direction;
  generating fourth audio data corresponding to the second direction, the first direction and the second direction corresponding to the first dimension;
  generating fifth audio data corresponding to a third direction, the first direction and the third direction corresponding to the second dimension;
  generating rotation-compensated audio data based at least in part on the second angle, the third angle, the third audio data, the fourth audio data, and the fifth audio data; and
  outputting the rotation-compensated audio data.

6. The computer-implemented method of claim 1, further comprising:
  determining an angle corresponding to the rotation;
  prior to causing the output data to be output, determining a first signal quality value of prior output data;
  determining a second signal quality value of the output data;
  determining that the second signal quality value indicates lower signal quality than the first signal quality value; and
  based on determining that the second signal quality value indicates lower signal quality than the first signal quality value, determining that the angle differs from the rotation of the device.

7. The computer-implemented method of claim 6, further comprising:
  determining an error value based at least in part on determining that the second signal quality value indicates lower signal quality than the first signal quality value;
  generating first rotation-compensated audio data based at least in part on the angle, the first audio data, and the error value;
  generating second rotation-compensated audio data based at least in part on the angle, the second audio data, and the error value;
  generating second output data using the first rotation-compensated audio data and the second rotation-compensated audio data;
  determining a third signal quality value of the second output data; and
  based on determining that the third signal quality value indicates greater signal quality than the second signal quality value, outputting the second output data.

8. The computer-implemented method of claim 1, further comprising:
  determining an angle corresponding to the rotation;
  selecting a first rotation-compensation function corresponding to a relationship between the angle and the first direction;
  selecting a second rotation-compensation function corresponding to a relationship between the angle and the second direction;
  evaluating the first rotation-compensation function using the angle to determine first evaluated data;
  evaluating the second rotation-compensation function using the angle to determine second evaluated data;
  generating first rotation-compensated audio data using the first audio data and the first evaluated data; and
  generating second rotation-compensated audio data using the second audio data and the second evaluated data,
  wherein generating the output data uses the first rotation-compensated audio data and the second rotation-compensated audio data.

9. The computer-implemented method of claim 1, further comprising:
  determining a first distance corresponding to linear motion of the device;
  determining a second distance corresponding to distance between the device and a source of audio;
  determining an angle based at least in part on the first distance and the second distance;
  generating first rotation-compensated audio data based at least in part on the angle and the first audio data; and
  generating second rotation-compensated audio data based at least in part on the angle and the second audio data,
  wherein generating the output data uses the first rotation-compensated audio data and the second rotation-compensated audio data.

10. A system comprising:
a device comprising at least one microphone array;
at least one processor; and
at least one memory including instructions that, when executed by the at least one processor, cause the system to:
  determine first data representing movement of the device from a first location to a second location, wherein the device has a first orientation at the first location and a second orientation at the second location, the second orientation differing from the first orientation by a change in angle of rotation;

perform beamforming using the at least one microphone array to generate first audio data corresponding to a first direction relative to the device;
perform beamforming using the at least one microphone array to generate second audio data corresponding to a second direction relative to the device; and
generate output data using the first data, the first audio data and the second audio data.

11. The system of claim 10, wherein the at least one memory further comprises instructions that, when executed by the at least one processor, further cause the system to:
determine that the first direction corresponds to a source of audio;
determine a first angle corresponding to the rotation;
determine a second angle corresponding to a difference between the first direction and the second direction;
determine the second angle is approximately equal to the first angle; and
generate rotation-compensated audio data based at least in part on the second direction corresponding to the source of the audio,
wherein generation of the output data uses the rotation-compensated audio data.

12. The system of claim 11, wherein the at least one memory further comprises instructions that, when executed by the at least one processor, further cause the system to:
receive, from a first microphone of the microphone array, first microphone data;
receive, from a second microphone of the microphone array, second microphone data, generate first phase-shifted microphone data by shifting, by a first amount, a phase of the second microphone data;
generate first data using the first microphone data and the first phase-shifted microphone data;
generate second phase-shifted microphone data by shifting, by a second amount different from the first amount, a phase of the second microphone data; and
generate second data using the first microphone data and the second phase-shifted microphone data.

13. The system of claim 11, wherein the at least one memory further comprises instructions that, when executed by the at least one processor, further cause the system to:
receive third audio data corresponding to the first direction;
receive fourth audio data corresponding to the second direction; and
generate, based on the third audio data and the fourth audio data, fifth audio data corresponding to a third direction between the first direction and the second direction.

14. The system of claim 11, wherein the at least one memory further comprises instructions that, when executed by the at least one processor, further cause the system to:
determine a first angle corresponding to the rotation;
determine a second angle corresponding to a second rotation of the device, the second angle corresponding to a first dimension;
determine a third angle corresponding to a third rotation of the device, the third angle corresponding to a second dimension;
generate third audio data corresponding to the first direction;
generate fourth audio data corresponding to the second direction, the first direction and the second direction corresponding to the first dimension;
generate fifth audio data corresponding to a third direction, the first direction and the third direction corresponding to the second dimension;
generate rotation-compensated audio data based at least in part on the second angle, the third angle, the third audio data, the fourth audio data, and the fifth audio data; and
output the rotation-compensated audio data.

15. The system of claim 11, wherein the at least one memory further comprises instructions that, when executed by the at least one processor, further cause the system to:
determine an angle corresponding to the rotation;
prior to causing the output data to be output, determine a first signal quality value of prior output data;
determine a second signal quality value of the output data;
determine that the second signal quality value indicates lower signal quality than the first signal quality value; and
based on determining that the second signal quality value indicates lower signal quality than the first signal quality value, determine that the first angle differs from the rotation of the device.

16. The system of claim 15, wherein the at least one memory further comprises instructions that, when executed by the at least one processor, further cause the system to:
determine an error value based at least in part on determining that the second signal quality value indicates lower signal quality than the first signal quality value;
generate first rotation-compensated audio data based at least in part on the first angle, the first audio data, and the error value;
generate second rotation-compensated audio data based at least in part on the first angle, the second audio data, and the error value;
generate second output data using the first rotation-compensated audio data and the second rotation-compensated audio data;
determine a third signal quality value of the second output data; and
based on determining that the third signal quality value indicates greater signal quality than the second signal quality value, outputting the second output data.

17. The system of claim 11, wherein the at least one memory further comprises instructions that, when executed by the at least one processor, further cause the system to:
determine an angle corresponding to the rotation;
select a first rotation-compensation function corresponding to a relationship between the first angle and the first direction;
select a second rotation-compensation function corresponding to a relationship between the first angle and the second direction;
evaluate the first rotation-compensation function using the angle to determine first evaluated data;
evaluate the second rotation-compensation function using the angle to determine second evaluated data;
generate first rotation-compensated audio data using the first audio data and the first evaluated data; and
generate second rotation-compensated audio data using the second audio data and the second evaluated data,
wherein generation of the output data uses the first rotation-compensated audio data and the second rotation-compensated audio data.

18. The system of claim 11, wherein the at least one memory further comprises instructions that, when executed by the at least one processor, further cause the system to:
determine a first distance corresponding to linear motion of the device;

determine a second distance corresponding to distance between the device and a source of audio;
determine an angle based at least in part on the first distance and the second distance;
generate first rotation-compensated audio data based at least in part on the angle and the first audio data; and
generate second rotation-compensated audio data based at least in part on the angle and the second audio data,
wherein generation of the output data uses the first rotation-compensated audio data and the second rotation-compensated audio data.

19. A computer-implemented method comprising:
determining a rotation of a voice-controlled device from a first position to a second position;
determining a first angle corresponding to the rotation;
generating first audio data corresponding to a first direction relative to the voice- controlled device;
generating second audio data corresponding to a second direction relative to the voice- controlled device;
generating first rotation-compensated audio data based at least in part on the first angle and the first audio data;
generating second rotation-compensated audio data based at least in part on the first angle and the second audio data;
using the first rotation-compensated audio data and the second rotation-compensated audio data to generate output data; and
causing the output data to be output.

20. A computer-implemented method comprising:
determining a rotation of a device from a first position to a second position;
generating first audio data corresponding to a first direction relative to the device;
generating second audio data corresponding to a second direction relative to the device;
generating first rotation-compensated audio data based at least in part on the rotation and the first audio data;
generating second rotation-compensated audio data based at least in part on the rotation and the second audio data; and
using the first rotation-compensated audio data and the second rotation-compensated audio data to generate output data.

* * * * *